United States Patent [19]

Hao et al.

[11] Patent Number: 5,821,373

[45] Date of Patent: Oct. 13, 1998

[54] SOLID SLOUTIONS OF 1,4-DIKETOPYRROLOPYRROLES

[75] Inventors: Zhimin Hao; Olof Wallquist, both of Marly, Switzerland

[73] Assignee: Ciba Specialty Chemicals Corporation, Tarrytown, N.Y.

[21] Appl. No.: 712,722

[22] Filed: Sep. 12, 1996

[30] Foreign Application Priority Data

Sep. 18, 1995 [CH] Switzerland .............................. 2630/95

[51] Int. Cl.⁶ .......................... C07D 487/04; C09B 48/00; C08K 5/07; C08K 5/3415

[52] U.S. Cl. .......................... 548/453; 548/215; 548/240; 548/255; 548/266.4; 548/335.1; 548/343.5; 548/364.7; 548/513; 548/515; 549/59; 549/472; 546/56; 546/208; 544/111; 544/373; 106/498; 534/558; 534/561; 534/816; 534/885

[58] Field of Search .............................. 548/453; 106/498

[56] References Cited

U.S. PATENT DOCUMENTS

| | | | |
|---|---|---|---|
| 4,579,949 | 4/1986 | Rochat et al. | 546/167 |
| 4,720,305 | 1/1988 | Iqbal et al. | 106/288 |
| 4,783,540 | 11/1988 | Bäbler | 548/453 |
| 4,810,304 | 3/1989 | Jaffe et al. | 106/494 |
| 5,476,949 | 12/1995 | Wallquist et al. | 548/453 |
| 5,518,539 | 5/1996 | Hao et al. | 106/495 |
| 5,554,217 | 9/1996 | Babler | 106/494 |
| 5,565,578 | 10/1996 | Bäbler | 548/453 |
| 5,641,351 | 6/1997 | Bäbler | 106/495 |
| 5,708,188 | 1/1998 | Hao et al. | 548/453 |

*Primary Examiner*—Johann Richter
*Assistant Examiner*—Jane C. Osewcki
*Attorney, Agent, or Firm*—Kevin T. Mansfield

[57] ABSTRACT

Solid solutions consisting of 3,6-bis(biphenyl-4-yl)- 2,5-dihydropyrrolo[3,4-c]pyrrole-1,4-dione and either a) a second 1,4-diketopyrrolopyrrole or b) a quinacridone, which are further defined herein, are outstandingly suited to pigmenting high molecular weight organic material.

6 Claims, No Drawings

SOLID SLOUTIONS OF 1,4-DIKETOPYRROLOPYRROLES

The present invention relates to novel, single-phase solid solutions of 3,6-bis-(biphenyl-4-yl)-2,5-dihydropyrrolo[3,4-c]pyrrole-1,4-dione and a quinacridone or another pyrrolopyrrole, and to their preparation and to the use thereof as pigments.

From U.S. Pat. Nos. 4,783,540 and 4,810,304 it is known that solid solutions can be obtained when two different 1,4-diketopyrrolopyrroles are mixed or when a 1,4-diketopyrrolo-pyrrole is mixed with a quinacridone, with subsequent treatment, for example by kneading, milling or reprecipitation. The solid solutions are characterized by their X-ray diffraction patterns, the X-ray diffraction patterns of the solid solutions differing from the sum of the X-ray diffraction patterns of the individual components. However, it has been ascertained that the products described in these patents are multiphase solid solutions; in other words, the corresponding X-ray diffraction patterns show not only the new lines of the solid solution but also lines of one and/or the other individual component.

It has now been found that in the presence of 3,6-bis(biphenyl-4-yl)-2,5-dihydropyrrolo-[3,4-c]pyrrole-1,4-dione (previously referred to in the patent literature as 1,4-diketo-3,6-bis(biphenyl-4-yl)pyrrolo[3,4-c]pyrrole), surprisingly, other pyrrolopyrroles and quinacridones settle as guests in its crystal lattice (host lattice) to form a single-phase solid solution. The solid solution obtained possesses, accordingly, the same crystal lattice as the 3,6-bis(biphenyl-4-yl)-2,5-dihydropyrrolo[3,4-c]pyrrole-1,4-dione, and the corresponding X-ray diffraction patterns are virtually identical.

By forming such solid solutions it is possible to obtain highly advantageous shifts in shades which are of great interest without adversely affecting the good pigment properties of the already established 3,6-bis(biphenyl-4-yl)-2,5-dihydropyrrolo[3,4-c]pyrrole-1,4-dione.

The present invention relates accordingly to solid solutions consisting of a pyrrolopyrrole of the formula

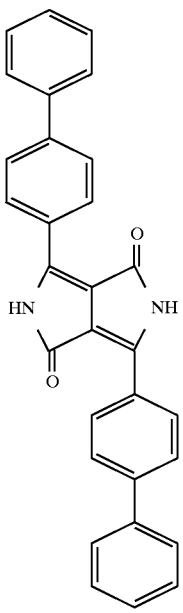

(I)

and a) a pyrrolopyrrole of the formula

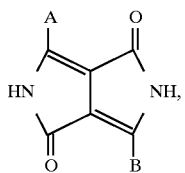

(II)

in which A and B independently of one another are a group of the formula

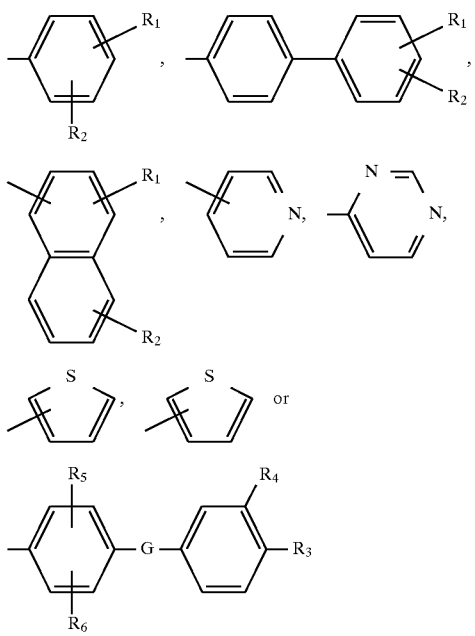

in which $R_1$ and $R_2$ independently of one another are hydrogen, halogen, $C_1$–$C_{18}$alkyl, $C_1$–$C_{18}$alkoxy, $C_1$–$C_{18}$alkylmercapto, $C_1$–$C_{18}$alkylamino, $C_1$–$C_{18}$alkoxycarbonyl, $C_1$C_{18}$alkylaminocarbonyl, —CN, —NO$_2$, trifluoromethyl, $C_5$–$C_6$cycloalkyl, —C=N—($C_1$–$C_{18}$alkyl),

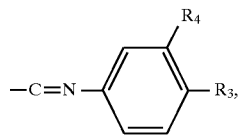

imidazolyl, pyrazolyl, triazolyl, piperazinyl, pyrrolyl, oxazolyl, benzoxazolyl, benzothiazolyl, benzimidazolyl, morpholinyl, piperidinyl or pyrrolidinyl, G is —CH$_2$—, —CH(CH$_3$)—, —C(CH$_3$)$_2$—, —CH=N—, —N=N—, —O—, —S—, —SO—, —SO$_2$—, —CONH— or —NR$_7$—, $R_3$ and $R_4$ independently of one another are hydrogen, halogen, $C_1$–$C_6$alkyl, $C_1$–$C_{18}$alkoxy or —CN, $R_5$ and $R_6$ independently of one another are hydrogen, halogen or $C_1$–$C_6$alkyl, and $R_7$ is hydrogen or $C_1$–$C_6$alkyl, or b) a quinacridone of the formula $$\text{(III)}$$

in which $R_8$ is hydrogen, halogen, $C_1$–$C_6$alkyl or $C_1$–$C_6$alkoxy, in the respective ratio I:II or I:III of 20–90% by weight: 80–10% by weight.

Any halogen substituents are, for example, iodine, fluorine, especially bromine and preferably chlorine;

- examples of $C_1$–$C_6$alkyl are methyl, ethyl, n-propyl, isopropyl, n-butyl, sec-butyl, tert-butyl, n-amyl, tert-amyl, hexyl and, in the case of $C_1$–$C_{18}$alkyl, additionally, for example, heptyl, octyl, 2-ethylhexyl, nonyl, decyl, dodecyl, tetradecyl, hexadecyl or octadecyl;
- $C_1$–$C_{18}$alkoxy, alone or in $C_1$–$C_{18}$alkoxycarbonyl, is, as for $C_1$–$C_6$alkoxy, for example methoxy, ethoxy, n-propoxy, isopropoxy, butyloxy, hexyloxy and, in addition, decyloxy, dodecyloxy, hexadecyloxy or octadecyloxy;
- examples of $C_1$–$C_{18}$alkylmercapto are methylmercapto, ethylmercapto, propylmercapto, butylmercapto, octylmercapto, decylmercapto, hexadecylmercapto and octadecylmercapto;
- $C_1$–$C_{18}$alkylamino, alone or in $C_1$–$C_{18}$alkylaminocarbonyl, is, for example, methylamino, ethylamino, propylamino, hexylamino, decylamino, hexadecylamino or octadecylamino.
- $C_5$–$C_6$cycloalkyl is, for example, cyclopentyl and in particular cyclohexyl.

Preferred pyrrolopyrroles of the formula II are those in which A and B independently of one another are a group of the formula in which $R_1$ and $R_2$ independently of one another are hydrogen, chlorine, bromine, $C_1$–$C_4$alkyl, $C_1$–$C_6$alkoxy, $C_1$–$C_6$alkylamino or CN, G is —O—, —NR$_7$—, —N=N— or —SO$_2$—, $R_3$ and $R_4$ are hydrogen, and $R_7$ is hydrogen, methyl or ethyl, and especially those in which A and B are a group of the formula in which $R_1$ and $R_2$ independently of one another are hydrogen, methyl, tert-butyl, chlorine, bromine or CN. $R_2$ is preferably hydrogen and A and B are preferably identical.

Preferred quinacridones of the formula III are those in which $R_8$ is hydrogen, methyl or, in particular, chlorine.

The novel solid solutions can be prepared starting from physical mixtures of the above-defined components of the formulae I and II or III by the following methods which are known per se:

- by contacting in polar organic solvents, preferably by stirring the mixture of components together at reflux temperature,
- by alkaline reprecipitation of the mixture of components in polar organic solvents or by stirring the mixture of components together in polar organic solvents in the presence of alkali metal alcoholates, alkali metal hydroxides or quaternary ammonium compounds, or
- by acidic reprecipitation, i.e. dissolving the mixture of components in acid and precipitating the solid solution by dilution with water,
- by intense milling or kneading of the mixture of components, with or without subsequent recrystallization in water and/or organic solvents, in which context it is possible, for example, to follow the procedures described in detail in U.S. Pat. No. 4 783 540.

A further, novel preparation method consists in reacting the compounds of the formulae I and II or III by methods known per se with a dicarbonate of the formula $$D—O—D \qquad \text{(IV)}$$

or with a trihaloacetate of the formula $$(R_9)_3C—D \qquad \text{(V)},$$

or with an azide of the formula $$DN_3 \qquad \text{(VI)},$$

or with a carbonate of the formula $$D—OR_{10} \qquad \text{(VII)},$$

or with an alkylideneiminooxyformate of the formula $$\text{(VIII)}$$

in which D is a group of the formula

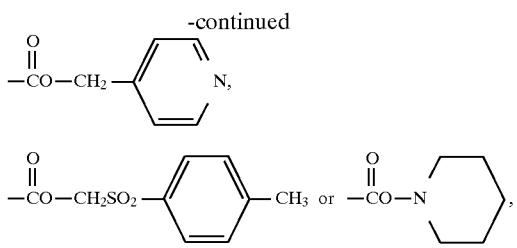

$R_9$ is chlorine, fluorine or bromine, $R_{10}$ is $C_1$–$C_4$alkyl or unsubstituted or halogen-, $C_1$–$C_4$alkyl-, $C_1$–$C_4$alkoxy- or —CN-substituted phenyl, $R_{11}$ is —CN or —COOR$_{10}$, and $R_{12}$ is unsubstituted or halogen-, $C_1$–$C_4$alkyl-, $C_1$–$C_4$alkoxy- or —CN-substituted phenyl, and $R_{13}$, $R_{14}$ and $R_{15}$ independently of one another are hydrogen, $C_1$–$C_6$alkyl or $C_2$–$C_5$alkenyl, where at least two of $R_{13}$, $R_{14}$ and $R_{15}$ must be alkyl or alkenyl, in a molar ratio of 1:2 in an aprotic organic solvent in the presence of a base as catalyst, to give soluble compounds of the formula

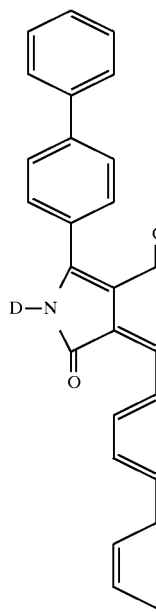 (IX)

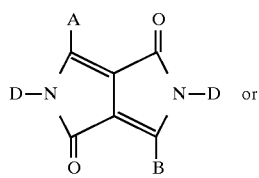 (X) or

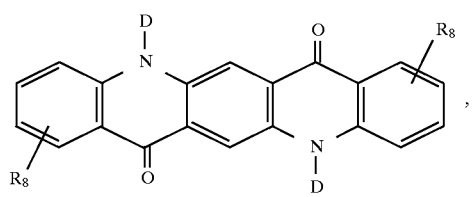 (XI)

subjecting the compounds IX and X or the compounds IX and XI either i) to homogeneous mixing by generally known methods in powder form in a molar ratio of 1:1, or ii) to homogeneous mixing by generally known methods in powder form in a molar ratio of 1:1 followed by dissolution of the mixture in a solvent, or iii) first of all to dissolution and then to mixing, in solution, in a ratio of 1:1, and then precipitating the desired mixed crystals from the dry or dissolved mixture by thermal, photolytic or chemical treatment.

$R_{13}$, $R_{14}$ and $R_{15}$ as $C_2$–$C_5$alkenyl are for example vinyl, allyl, methallyl, n-but-2-enyl, 2-methylprop-2-enyl or n-pent-2-enyl.

$R_{13}$ and $R_{15}$ are preferably methyl and $R_{14}$ is preferably $C_1$–$C_6$alkyl, and in particular is methyl.

It is preferred to react the compounds of the formulae I and II or III with a dicarbonate of the formula IV.

The dicarbonates of the formula IV, trihaloacetates of the formula V, azides of the formula VI, carbonates of the formula VII and alkylideneiminooxyformates of the formula VIII are known substances. Should any still be novel, then they can be prepared in analogy to generally known methods.

Examples of suitable aprotic organic solvents are ethers, such as tetrahydrofuran or dioxane, or glycol ethers, such as ethylene glycol methyl ether, ethylene glycol ethyl ether, diethylene glycol monomethyl ether or diethylene glycol monoethyl ether, and also dipolar aprotic solvents, such as acetonitrile, benzonitrile, N,N-dimethylformamide, N,N-dimethylacetamide, nitrobenzene, N-methylpyrrolidone, halogenated aliphatic or aromatic hydrocarbons, such as trichloroethane, benzene or alkyl-, alkoxy- or halogen-substituted benzene, such as toluene, xylene, anisole or chlorobenzene, or aromatic N-heterocycles, such as pyridine, picoline or quinoline. Examples of preferred solvents are tetrahydrofuran, N,N-dimethylformamide and N-methylpyrrolidone. The solvents mentioned can also be employed as mixtures. It is expedient to use 5–20 parts by weight of solvent to 1 part by weight of the reactants.

Examples of bases suitable as catalyst are the alkali metals themselves, such as lithium, sodium or potassium and their hydroxides and carbonates, or alkali metal amides, such as lithium, sodium or potassium amide, or alkali metal hydrides, such as lithium, sodium or potassium hydride, or alkaline earth metal or alkali metal alcoholates, which are derived, in particular, from primary, secondary or tertiary aliphatic alcohols having 1 to 10 carbon atoms, examples being lithium, sodium or potassium methylate, ethylate, n-propylate, isopropylate, n-butylate, sec-butylate, tert-butylate, 2-methyl-2-butylate, 2-methyl-2-pentylate, 3-methyl-3-pentylate, 3-ethyl-3-pentylate, and also organic aliphatic, aromatic or heterocyclic nitrogen bases, examples including diazabicyclooctane, diazabicycloundecene and 4-dimethylaminopyridine and trialkylamines, for example trimethylamine or triethylamine. However, it is also possible to use a mixture of these bases.

Preference is given to the organic nitrogen bases, for example diazabicyclooctane, diazabicycloundecene and, in particular, 4-dimethylaminopyridine.

The reaction is expediently carried out at temperatures between 10° and 100° C., in particular between 18° and 40° C., i.e. preferably at room temperature, and at atmospheric pressure.

The compounds of the formula I, II or III are either mixed in the desired ratio in powder form by generally known methods, and the mixture is dissolved in the solvent, or they are first dissolved and the solutions are then mixed in the desired ratio.

It is expediently possible to employ the following solvents: ethers, such as tetrahydrofuran or dioxane, or glycol ethers, such as ethylene glycol methyl ether, ethylene glycol ethyl ether, diethylene glycol monomethyl ether or diethylene glycol monoethyl ether, polyalcohols, such as polyethylene glycol, ketones, such as acetone, ethyl methyl ketone, isobutyl methyl ketone or cyclohexanone, and also dipolar aprotic solvents, such as acetonitrile, benzonitrile, N,N-dimethylformamide, N,N-dimethylacetamide, nitrobenzene, N-methylpyrrolidone, dimethyl sulfoxide, halogenated aliphatic or aromatic hydrocarbons, such as trichloroethane, dichloromethane, chloroform, benzene or alkyl-, alkoxy- or halogen-substituted benzene, such as toluene, xylene, anisole or chlorobenzene, aromatic N-heterocycles, such as pyridine, picoline or quinoline or high-boiling solvents, such as decalin, n-dodecane or kerosene, or mixtures thereof. Examples of preferred solvents are toluene, diphenyl ether, N-methylpyrrolidone, N,N-dimethylformamide, dimethyl sulfoxide and quinoline.

The concentration of the compounds of the formula I, II and/or III in the solvent or solvent system may vary sharply depending on the solvent. It is expedient to employ from 0.1 to 20% by weight of compound of the formula I, II and/or III, based on the total solution, and preferably from 0.2 to 5% by weight.

From the dry or dissolved mixture, the solid solutions consisting of the compounds of the formula I, II or III can be obtained very simply by treating the dry or dissolved mixture, whether a) thermally, i.e. for example by heating at temperatures between 50° and 400° C., preferably between 100° and 200° C., or laser irradiation, b) photolytically, i.e. for example by exposure to light of wavelengths below 375 nm, or c) chemically, i.e. for example with organic or inorganic acids, for example acetic, toluenesulfonic, trifluoroacetic, hydrochloric or sulfuric acid, and isolating the resulting product by conventional methods.

The ratio between the components which form the novel solid solutions is preferably 60–90% by weight of pyrrolopyrrole of the formula I to 40–10% by weight of pyrrolopyrrole of the formula II or 80–90% by weight of pyrrolopyrrole of the formula I to 20–10% by weight of quinacridone of the formula III.

If recrystallization or thermal treatment of the novel solid solutions is necessary, then it is effected by methods customary for pigments. In general this involves a thermal after-treatment in water or in an organic solvent, at atmospheric or superatmospheric pressure. It is preferred to use organic solvents, for example benzenes substituted by halogen atoms, alkyl groups or nitro groups, such as xylenes, chlorobenzene, o-dichlorobenzene or nitrobenzene, and pyridine bases, such as pyridine, picoline or quinoline, and also ketones, such as cyclohexanone, alcohols, such as isopropanol, butanols or pentanols, ethers, such as ethylene glycol monomethyl ether or monoethyl ether, amides, such as dimethylformamide or N-methylpyrrolidone, and dimethyl sulfoxide or sulfolane. The after-treatment can also be carried out in water, under atmospheric or superatmospheric pressure, in the presence of organic solvents and/or with the addition of surface-active substances.

The novel solid solutions can be used as pigments for colouring high molecular mass organic material.

Examples of high molecular mass organic materials which can be coloured or pigmented with the novel solid solutions are cellulose ethers and cellulose esters, such as ethylcellulose, nitrocellulose, cellulose acetate, cellulose butyrate, natural resins or synthetic resins, such as addition polymerization resins or condensation polymerization resins, such as amino resins, especially urea-formaldehyde and melamine-formaldehyde resins, alkyd resins, phenolic resins, polycarbonates, polyolefins, polystyrene, polyvinyl chloride, polyamides, polyurethanes, polyesters, ABS, polyphenylene oxides, rubber, casein, silicone and silicone resins, individually or in mixtures.

The abovementioned high molecular mass organic compounds can be present individually or in mixtures as plastic masses, melts or in the form of spinning solutions, varnishes, coating materials or printing inks. Depending on the intended use it may prove advantageous to employ the novel solid solutions as toners or in the form of preparations.

Based on the high molecular mass organic material to be pigmented, the novel solid solutions can be employed in a quantity of from 0.01 to 30% by weight, preferably from 0.1 to 10% by weight.

The pigmenting of the high molecular mass organic substances with the novel solid solutions takes place, for example, by mixing such solid solutions, if desired in the form of masterbatches, into these substrates using rollers or mixing or milling apparatus. The pigmented material is subsequently brought into the desired final form by methods known per se, such as calendering, compression moulding, extrusion, spreading, casting or injection moulding. It is often desired, in order to produce non-rigid mouldings or to reduce their brittleness, to incorporate plasticizers into the high molecular mass compounds prior to the forming step. Examples of such plasticizers which can be used are esters of phosphoric acid, phthalic acid or sebacic acid. The plasticizers can be incorporated into the polymers before or after the incorporation of the novel solid solutions. In order to obtain different shades of colour it is possible, furthermore, to add fillers and/or other colour-imparting constituents, such as white pigments, coloured pigments or black pigments, in any desired quantities to the high molecular mass organic substances, in addition to the novel solid solutions.

For pigmenting varnishes, coating materials and printing inks the high molecular mass organic materials and the novel solid solutions, together if desired with additives, such as fillers, other pigments, siccatives or plasticizers, are dissolved or finely dispersed in a common organic solvent or solvent mixture. In this case it is possible to follow a procedure in which the individual components, alone or several together, are dispersed or dissolved, and only then are all of the components combined.

The novel solid solutions are particularly suitable for colouring plastics, especially polyvinyl chloride and polyolefins, and paints, especially automotive paints.

In colouring applications, for example the colouring of polyvinyl chloride or polyolefins, the novel solid solutions are also notable for good general pigment properties, such as good dispersibility, high colour strength and cleanness, good fastness to migration, heat, light and weathering, and good hiding power.

The examples which follow illustrate the invention.

Example 1a): (Preparation of the soluble diketopyrrolopyrrole)

A mixture of 14.75 g (0.0512 mol) of 3,6-diphenyl-2,5-dihydropyrrolo[3,4-c]pyrrole-1,4-dione and 27.94 g (0.128 mol) of di-tert-butyl dicarbonate in 500 ml of tetrahydrofuran is admixed with 3.23 g (0.0264 mol) of 4-dimethylaminopyridine. The red suspension obtained is stirred for 2 hours at room temperature under conditions of exclusion of atmospheric humidity. The solvent is distilled off under reduced pressure. The yellow residue is washed with methanol and dried at room temperature in vacuo, to give 23.8 g (95% of theory) of N,N-di-tert-butoxycarbonyl-3,6-diphenyl-2,5-dihydropyrrolo[3,4-c]pyrrole-1,4-dione.

| Analysis | C | H | N |
|---|---|---|---|
| Calc.: | 68.84% | 5.78% | 5.73% |
| Found: | 68.71% | 5.79% | 5.71% |

Example 1b): (Preparation of the soluble diketopyrrolopyrrole)

A suspension of 11.01 g (0.025 mol) of 3,6-bis(4-biphenylyl)-2,5-dihydropyrrolo-[3,4-c]pyrrole-1,4-dione in 500 ml of N,N-dimethylformamide (dried over molecular sieve) is admixed with 1.70 g (0.014 mol) of 4-dimethylaminopyridine and then with 13.64 g (0.062 mol) of di-tert-butyl dicarbonate. The reaction mixture is stirred at room temperature under conditions of exclusion of atmospheric humidity. After 20 hours an additional 13.64 g (0.062 mol) of di-tert-butyl dicarbonate are added and stirring is continued for 70 hours. The precipitated substance is filtered off, washed with methanol and dried at room temperature in vacuo, to give 14.0 g (87% of theory) of an orange product.

| Analysis | C | H | N |
|---|---|---|---|
| Calc.: | 74.98% | 5.66% | 4.37% |
| Found: | 74.22% | 5.75% | 4.92% |

Example 1c): (Preparation of the solid solution)

A mixture of 0.98 g (2.0 mmol) of the product from a) and 5.13 g (8.0 mmol) of the product from b) is heated to 70° C. with stirring in 200 ml of toluene. 20.0 g (0.10 mol) of toluene-4-sulfonic acid monohydrate are added to the resulting mixture, heating is carried out to 110° C., and the mixture is stirred at this temperature for 2 hours and then left to cool to room temperature. The solid substance formed is filtered off, washed first with methanol and then with water, and dried at 80° C. in vacuo, to give 3.3 g (80% of theory) of a red powder.

| Analysis | C | H | N |
|---|---|---|---|
| Calc.: | 80.84% | 4.52% | 6.83% |
| Found: | 81.09% | 4.31% | 6.67% |

The complete X-ray diffraction patterns are determined by customary methods using a SIEMENS D 500® X-ray diffractometer (CuK$_\alpha$ radiation).

The X-ray diffraction pattern is characterized by the following diffraction lines

| Interplanar spacings (d in Å) | scattering angles (2Θ) | relative intensity (%) |
|---|---|---|
| 22.6969 | 3.89 | 100 |
| 11.1340 | 7.93 | 16 |
| 7.3831 | 11.98 | 17 |
| 4.9988 | 17.73 | 75 |
| 4.7213 | 18.78 | 48 |
| 4.4016 | 20.16 | 16 |
| 3.6334 | 24.48 | 13 |
| 3.4269 | 25.98 | 23 |
| 3.3602 | 26.51 | 51 |
| 3.2202 | 27.68 | 28 |
| 3.1623 | 28.20 | 17 |
| 3.0660 | 29.10 | 14 |

The X-ray diffraction pattern of the compound supplying the host lattice, 3,6-bis-(4-biphenylyl)-2,5-dihydropyrrolo[3,4-c]pyrrole-1,4-dione, is characterized by the following diffraction lines

| Interplanar spacings (d in Å) | scattering angles (2Θ) | relative intensity (%) |
|---|---|---|
| 22.1785 | 3.98 | 51 |
| 11.0008 | 8.03 | 10 |
| 7.3287 | 12.07 | 12 |
| 4.9809 | 17.79 | 100 |
| 4.7273 | 18.76 | 59 |
| 4.3773 | 20.27 | 11 |
| 3.6218 | 24.56 | 14 |
| 3.4124 | 26.09 | 29 |
| 3.3473 | 26.61 | 85 |
| 3.2073 | 27.79 | 39 |
| 3.1654 | 28.17 | 17 |
| 3.0553 | 29.21 | 17 |

Comparison shows that the two X-ray diffraction patterns are in virtual agreement.

Example 2: A mixture of 0.80 g (2.24 mmol) of 3,6-bis(4-chlorophenyl)-2,5-dihydro-pyrrolo[3,4-c]pyrrole-1,4-dione, 2.24 g (5.08 mmol) of 3,6-bis(4-biphenylyl)-2,5-dihydro-pyrrolo[3,4-c]pyrrole-1,4-dione and 0.93 g (16.58 mmol) of potassium hydroxide in 65 ml of dimethyl sulfoxide is heated with stirring to 50° C. and stirred at this temperature for 2 hours. The violet solution obtained is poured into a mixture of 150 ml of water, 60 ml of methanol and 0.91 ml (16.63 mmol) of concentrated sulfuric acid at 20° C. and the mixture is then stirred for 6 hours at room temperature. The precipitated pigment is filtered off, washed first with methanol and then with water, and dried at 60° C. in vacuo, to give 2.64 g (87% of theory) of a red powder.

| Analysis | C | H | N | Cl |
|---|---|---|---|---|
| Calc.: | 76.31% | 4.12% | 6.74% | 5.12% |
| Found: | 74.79% | 4.29% | 6.57% | 5.22% |

The X-ray diffraction pattern is characterized by the following diffraction lines

| Interplanar spacings (d in Å) | scattering angles (2Θ) | relative intensity (%) |
|---|---|---|
| 22.1548 | 3.99 | 100 |
| 10.9616 | 8.06 | 16 |
| 7.3090 | 12.10 | 24 |
| 4.9515 | 17.90 | 75 |
| 4.7245 | 18.77 | 58 |
| 4.3778 | 20.27 | 25 |
| 3.6162 | 24.60 | 26 |
| 3.3633 | 26.48 | 54 |

-continued

| Interplanar spacings (d in Å) | scattering angles (2Θ) | relative intensity (%) |
|---|---|---|
| 3.3416 | 26.66 | 62 |
| 3.1908 | 27.94 | 41 |
| 3.1602 | 28.22 | 38 |

Example 3: Following the procedure described in Example 2 but replacing the corresponding pigments by 2,9-dichloroquinacridone (1.54 mmol) and 3,6-bis-(4-biphenylyl)-2,5-dihydropyrrolo[3,4-c]pyrrole-1,4-dione (6.02 mmol) gives 2.98 g (92% of theory) of a red powder.

| Analysis | C | H | N | Cl |
|---|---|---|---|---|
| Calc.: | 78.46% | 4.23% | 6.53% | 3.31% |
| Found: | 76.92% | 4.31% | 6.35% | 3.32% |

The X-ray diffraction pattern is characterized by the following diffraction lines

| Interplanar spacings (d in Å) | scattering angles (2Θ) | relative intensity (%) |
|---|---|---|
| 23.1808 | 3.81 | 100 |
| 11.0967 | 7.96 | 16 |
| 7.3487 | 12.03 | 24 |
| 5.0351 | 17.60 | 56 |
| 4.9901 | 17.76 | 62 |
| 4.7163 | 18.80 | 55 |
| 4.4141 | 20.10 | 27 |
| 3.3733 | 26.40 | 62 |
| 3.3579 | 26.52 | 63 |
| 3.2247 | 27.64 | 48 |
| 3.2065 | 27.80 | 43 |

Example 4: A mixture of 1.43 g (4 mmol) of 3,6-bis(4-chlorophenyl)-2,5-dihydropyrrolo-[3,4-c]pyrrole-1,4-dione, 2.64 g (6 mmol) of 3,6-bis(4-biphenylyl)-2,5-dihydropyrrolo[3,4-c]pyrrole-1,4-dione and 1.68 g of potassium hydroxide in 70 ml of dimethyl sulfoxide is heated to 60° C. and stirred at this temperature for 2.5 hours. The reaction mixture is then introduced into a solution of 0.81 ml of concentrated sulfuric acid and 240 ml of water and stirred for 3 hours at 60° C. The red suspension is filtered and the residue is washed with methanol and then with water, and dried at 60° C. in vacuo, to give 3.5 g (84% of theory) of a red powder.

| Analysis | C | H | N | Cl |
|---|---|---|---|---|
| Calc.: | 73.29% | 3.88% | 6.96% | 7.94% |
| Found: | 74.47% | 4.07% | 6.87% | 6.93% |

The X-ray diffraction pattern is characterized by the following diffraction lines:

| Interplanar spacings (d in Å) | scattering angles (2Θ) | relative intensity (%) |
|---|---|---|
| 22.544 | 3.92 | 100 |
| 11.052 | 7.99 | 20 |
| 7.359 | 12.02 | 28 |
| 4.974 | 17.82 | 96 |
| 4.795 | 18.49 | 73 |
| 4.386 | 20.23 | 28 |
| 3.624 | 24.54 | 33 |
| 3.413 | 26.09 | 46 |
| 3.349 | 26.59 | 75 |
| 3.206 | 27.80 | 54 |
| 3.165 | 28.17 | 48 |
| 2.911 | 30.69 | 22 |

Example 5: A mixture of 5.7 g (16 mmol) of 3,6-bis(4-chlorophenyl)-2,5-dihydropyrrolo-[3,4-c]pyrrole-1,4-dione, 10.6 g (24 mmol) of 3,6-bis(4-biphenylyl)-2,5-dihydropyrrolo[3,4-c]pyrrole-1,4-dione and 6.73 g of potassium hydroxide in 250 ml of tert-amyl alcohol is heated to 100° C. and stirred at this temperature for 1 hour. The reaction mixture is then cooled to 60° C., introduced into a solution, cooled to 0° C., of 170 ml of methanol and 170 ml of water, and subsequently stirred at 0° C. for 2 hours. The red suspension is filtered and the residue is washed with methanol and water and dried at 80° C. in vacuo, to give 14.8 g (90.8% of theory) of a red powder.

| Analysis | C | H | N | Cl |
|---|---|---|---|---|
| Calc.: | 73.29% | 3.88% | 6.96% | 7.94% |
| Found: | 73.48% | 3.89% | 6.70% | 7.21% |

The X-ray diffraction pattern is characterized by the following diffraction lines:

| Interplanar spacings (d in Å) | scattering angles (2Θ) | relative intensity (%) |
|---|---|---|
| 22.365 | 3.95 | 100 |
| 11.041 | 8.00 | 21 |
| 7.404 | 11.94 | 30 |
| 4.912 | 18.05 | 63 |
| 4.734 | 18.73 | 55 |
| 4.436 | 20.00 | 29 |
| 3.617 | 24.59 | 28 |
| 3.462 | 25.71 | 30 |
| 3.339 | 26.68 | 46 |
| 3.165 | 28.17 | 39 |

Example 6: A mixture of 2.14 g (6 mmol) of 3,6-bis(4-chlorophenyl)-2,5-dihydropyrrolo-[3,4-c]pyrrole-1,4-dione, 10.57 g (24 mmol) of 3,6-bis(4-biphenylyl)-2,5-dihydropyrrolo-[3,4-c]pyrrole-1,4-dione and 5.05 g of potassium hydroxide in 200 ml of tert-amyl alcohol is heated to 100° C. and stirred at this temperature for 1 hour. The reaction mixture is then cooled to 80° C., introduced into a solution, cooled to 0° C., of 2.64 ml of concentrated sulfuric acid, 300 ml of methanol and 300 ml of water, and subsequently stirred at 0° C. for 2 hours. The red suspension is filtered and the residue is washed with methanol and water and dried at 80° C. in vacuo, to give 11.85 g (93% of theory) of a red powder.

| Analysis | C | H | N | Cl |
|---|---|---|---|---|
| Calc.: | 77.55% | 4.22% | 6.66% | 3.97% |
| Found: | 77.52% | 4.41% | 6.44% | 3.44% |

The X-ray diffraction pattern is characterized by the following diffraction lines:

| Interplanar spacings (d in Å) | scattering angles (2Θ) | relative intensity (%) |
|---|---|---|
| 23.785 | 3.71 | 100 |
| 11.421 | 7.74 | 13 |
| 7.573 | 11.68 | 21 |
| 4.968 | 17.84 | 54 |
| 4.774 | 18.57 | 45 |
| 4.704 | 18.85 | 38 |
| 4.505 | 19.69 | 22 |
| 3.647 | 24.39 | 16 |
| 3.449 | 25.81 | 26 |
| 3.354 | 26.55 | 41 |
| 3.185 | 27.99 | 23 |

Example 7: Following the procedure described in Example 6 but replacing the corresponding pigments by in each case 2,9-dichloroquinacridone (6 mmol) and 3,6-bis-(4-biphenylyl)-2,5-dihydropyrrolo[3,4-c]pyrrole-1,4-dione (24 mmol) gives 12.6 g (98% of theory) of a red powder.

| Analysis | C | H | N | Cl |
|---|---|---|---|---|
| Calc.: | 78.04% | 4.19% | 6.56% | 3.72% |
| Found: | 76.32% | 4.13% | 6.24% | 3.40% |

The X-ray diffraction pattern is characterized by the following diffraction lines:

| Interplanar spacings (d in Å) | scattering angles (2Θ) | relative intensity (%) |
|---|---|---|
| 23.522 | 3.75 | 100 |
| 11.344 | 7.79 | 18 |
| 7.555 | 11.70 | 28 |
| 4.954 | 17.89 | 66 |
| 4.724 | 18.77 | 50 |
| 4.523 | 19.61 | 29 |
| 3.350 | 26.59 | 50 |
| 3.249 | 27.43 | 50 |
| 3.023 | 29.52 | 24 |

Example 8: A mixture of 0.76 g (2 mmol) of 2,9-dichloroquinacridone, 3.52 g (8 mmol) of 3,6-bis(4-biphenylyl)-2,5-dihydropyrrolo[3,4-c]pyrrole-1,4-dione and 120 ml of Dowtherm® A* is heated to 250° C. and stirred at this temperature for 4 hours. The reaction mixture is then cooled to 80° C. The red suspension is filtered and the residue is washed with methanol and then with water and dried at 80° C. in vacuo, to give 3.85 g (90% of theory) of a red powder.

* Dowtherm® A=biphenyl/diphenyl ether mixture

| Analysis | C | H | N | Cl |
|---|---|---|---|---|
| Calc.: | 78.04% | 4.19% | 6.56% | 3.72% |
| Found: | 77.68% | 4.07% | 6.40% | 3.42% |

The X-ray diffraction pattern is characterized by the following diffraction lines:

| Interplanar spacings (d in Å) | scattering angles (2Θ) | relative intensity (%) |
|---|---|---|
| 22.078 | 3.99 | 100 |
| 10.990 | 8.04 | 19 |
| 7.309 | 12.10 | 21 |
| 4.980 | 17.80 | 64 |
| 4.736 | 18.72 | 37 |
| 4.373 | 20.29 | 18 |
| 3.622 | 24.56 | 13 |
| 3.413 | 26.08 | 17 |
| 3.349 | 26.60 | 50 |
| 3.211 | 27.77 | 44 |
| 3.035 | 29.41 | 12 |

Example 9: A mixture of 1.09 g (3 mmol) of 3-phenyl-6-(4-biphenylyl)-2,5-dihydropyrrolo[3,4-c]pyrrole-1,4-dione, 2.64 g (6 mmol) of 3,6-bis(4-biphenylyl)-2,5-dihydropyrrolo[3,4-c]pyrrole-1,4-dione and 1.51 g of potassium hydroxide in 60 ml of dimethyl sulfoxide is heated to 50° C. and stirred at this temperature for 4.5 hours. The reaction mixture is then introduced into a solution of 60 ml of methanol and 240 ml of water and stirred at room temperature for 4 hours. The red suspension is filtered and the residue is washed with methanol and then with water and dried at 60° C. in vacuo, to give 3.4 g (91% of theory) of a red powder.

| Analysis | C | H | N |
|---|---|---|---|
| Calc.: | 80.90% | 4.53% | 6.80% |
| Found: | 79.52% | 4.60% | 6.47% |

The X-ray diffraction pattern is characterized by the following diffraction lines:

| Interplanar spacings (d in Å) | scattering angles (2Θ) | relative intensity (%) |
|---|---|---|
| 23.595 | 3.74 | 100 |
| 11.513 | 7.67 | 13 |
| 7.450 | 11.87 | 20 |
| 5.015 | 17.67 | 49 |
| 4.759 | 18.63 | 51 |
| 4.505 | 19.69 | 29 |
| 3.638 | 24.45 | 17 |
| 3.347 | 26.61 | 57 |
| 3.221 | 27.67 | 29 |
| 3.055 | 29.21 | 15 |

Example 10: A mixture of 0.42 g (1.46 mmol) of 3,6-diphenyl-2,5-dihydropyrrolo-[3,4-c]pyrrole-1,4-dione, 2.58 g (5.86 mmol) of 3,6-bis(4-biphenylyl)-2,5-dihydropyrrolo-[3,4-c]pyrrole-1,4-dione and 0.91 g of potassium hydroxide in 90 ml of dimethyl sulfoxide is heated to 50° C. and stirred at this temperature for 2 hours. The reaction mixture is then introduced into a solution of 0.88 ml of concentrated sulfuric acid, 90 ml of methanol and 180 ml of water and stirred at 60° C. for 3 hours. The red suspension is filtered and the residue is washed with methanol and then with water and dried at 60° C. in vacuo, to give 2.5 g (82% of theory) of a red powder.

| Analysis | C | H | N |
|---|---|---|---|
| Calc.: | 80.84% | 4.52% | 6.86% |
| Found: | 79.95% | 4.72% | 6.71% |

The X-ray diffraction pattern is characterized by the following diffraction lines:

| Interplanar spacings (d in Å) | scattering angles (2Θ) | relative intensity (%) |
|---|---|---|
| 23.385 | 3.77 | 100 |
| 11.069 | 7.98 | 15 |
| 7.410 | 11.93 | 24 |
| 4.905 | 18.07 | 65 |
| 4.769 | 18.59 | 60 |
| 3.719 | 23.91 | 19 |
| 3.354 | 26.55 | 61 |
| 3.163 | 28.19 | 30 |

Example 11: Repeating the procedure described in Example 9 but replacing the corresponding pigments by in each case 2,9-dimethylquinacridone (2 mmol) and 3,6-bis-(4-biphenylyl)-2,5-dihydropyrrolo[3,4-c]pyrrole-1,4-dione (8 mmol) gives 3.8 g (91% of theory) of a red powder.

| Analysis | C | H | N |
|---|---|---|---|
| Calc.: | 80.97% | 4.61% | 6.74% |
| Found: | 79.50% | 4.75% | 6.35% |

The X-ray diffraction pattern is characterized by the following diffraction lines:

| Interplanar spacings (d in Å) | scattering angles (2Θ) | relative intensity (%) |
|---|---|---|
| 23.202 | 3.80 | 100 |
| 11.115 | 7.95 | 15 |
| 7.475 | 11.83 | 28 |
| 4.993 | 17.75 | 59 |
| 4.734 | 18.73 | 59 |
| 3.673 | 24.21 | 23 |
| 3.347 | 26.62 | 67 |
| 3.154 | 28.27 | 30 |
| 3.049 | 29.27 | 24 |

Example 12: Following a procedure similar to that described in Example 8 but using, instead of 0.76 g of 2,9-dichloroquinacridone, 0.68 g of 2,9-dimethylquinacridone gives 3.9 g (93% of theory) of a red powder.

| Analysis | C | H | N |
|---|---|---|---|
| Calc.: | 80.97% | 4.61% | 6.74% |
| Found: | 80.60% | 4.50% | 6.39% |

The X-ray diffraction pattern is characterized by the following diffraction lines:

| Interplanar spacings (d in Å) | scattering angles (2Θ) | relative intensity (%) |
|---|---|---|
| 22.392 | 3.94 | 100 |
| 11.064 | 7.98 | 18 |
| 7.344 | 12.04 | 20 |
| 4.993 | 17.75 | 71 |
| 4.758 | 18.63 | 42 |
| 4.387 | 20.22 | 17 |
| 3.629 | 24.51 | 14 |
| 3.418 | 26.05 | 20 |
| 3.355 | 26.55 | 51 |
| 3.215 | 27.72 | 27 |
| 3.165 | 28.17 | 16 |
| 3.048 | 29.28 | 15 |

Example 13: Replacing the 0.76 g of 2,9-dichloroquinacridone used in Example 8 by 0.62 g of quinacridone gives, by an analogous working-up procedure in accordance with Example 8, a red powder (3.8 g, 92% of theory).

| Analysis | C | H | N |
|---|---|---|---|
| Calc.: | 80.82% | 4.43% | 6.88% |
| Found: | 80.82% | 4.34% | 6.53% |

The X-ray diffraction pattern is characterized by the following diffraction lines:

| Interplanar spacings (d in Å) | scattering angles (2Θ) | relative intensity (%) |
|---|---|---|
| 22.208 | 3.98 | 100 |
| 11.005 | 8.03 | 17 |
| 4.985 | 17.78 | 56 |
| 4.739 | 18.71 | 33 |
| 4.378 | 20.27 | 15 |
| 3.624 | 24.54 | 10 |
| 3.410 | 26.11 | 17 |
| 3.350 | 26.59 | 44 |
| 3.211 | 27.76 | 23 |
| 3.161 | 28.21 | 12 |
| 3.053 | 29.23 | 11 |

Example 14: 7.5 g of the solid solution of Example 1, 98.9 g of CAB solution consisting of 41.0 g of cellulose acetobutyrate ® CAB 531.1, 20% in butanol/xylene 2:1 (Eastman Chem.),
1.5 g of zirconium octoate,
18.5 g of ® SOLVESSO 150 (aromatic hydrocarbons, ESSO),
21.5 g of butyl acetate and
17.5 g of xylene, 36.5 g of polyester resin ® DYNAPOL H700 (Dynamit Nobel), 4.6 g of melamine resin MAPRENAL MF650 (Hoechst) and 2.5 g of dispersant ® DISPERBYK 160 (Byk Chemie) are together dispersed for 90 minutes using a shaker machine (total coating material 150 g; 5% pigment).

27.69 g of the resulting mass-tone lacquer are mixed, for the base-coat formulation, with 17.31 g of Al stock solution (8%) consisting of 12.65 g of ® SILBERLINE SS 3334AR, 60% (Silberline Ltd.)
56.33 g of CAB solution (for composition see above)
20.81 g of polyester resin ® DYNAPOL H700

-continued

|  |
| --- |
| 2.60 g of melamine resin ® MAPRENAL MF650 |
| 7.59 g of ® SOLVESSO 150 | and applied by spraying to an aluminium panel (wet film about 20 μm). After an evaporation period of 30 minutes it room temperature, a thermosetting acrylic varnish consisting of

|  |
| --- |
| 29.60 g of acrylic resin ® URACRON 2263 XB, 50% in xylene/butanol (Chem. Fabrik Schweizerhalle), |
| 5.80 g of melamine resin ® CYMEL 327.90% in isobutanol, |
| 2.75 g of butylglycol acetate, |
| 5.70 g of xylene, |
| 1.65 g of n-butanol |
| 0.50 g of silicone fluid, 1% in xylene, |
| 3.00 g of light stabilizer ® TINUVIN 900, 10% in xylene (Ciba) |
| 1.00 g of light stabilizer ® TINUVIN 292, 10% in xylene (Ciba) | as topcoat formulation is applied by spraying (wet film about 50 μm). The coating is then, after a further evaporation time of 30 minutes at room temperature, baked at 130° C. for 30 minutes. A red coating with very good resistance properties is obtained.

Example 15: 0.6 g of the solid solution from Example 2 is mixed with 67 g of polyvinyl chloride, 33 g of dioctyl phthalate, 2 g of dibutyltin dilaurate and 2 g of titanium dioxide and the mixture is processed on a roller table at 160° C. for 15 minutes to give a thin film. The red PVC film thus produced is very strong in colour and is stable to migration and light.

Example 16: 1,000 g of polypropylene granules (®DAPLEN PT-55, Chemie LINZ) and 20 g of a 50% pigment preparation consisting of 10 g of the solid solution of Example 3 and 10 g of magnesium behenate are mixed intensively in a mixing drum. The granules thus treated are spun at from 260° to 285° C. by the melt spinning technique, to give red-coloured fibres with very good light fastness and textile fastness properties.

What is claimed is:
1. A single phase two component solid solution consisting of a pyrrolopyrrole of the formula

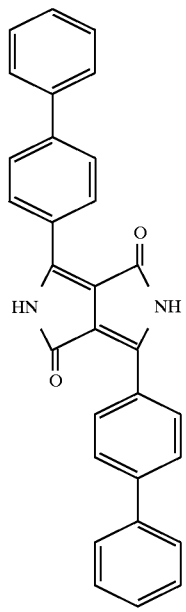

and
a) a pyrrolopyrrole of the formula

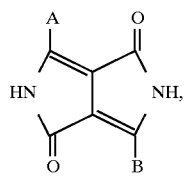

in which A abd B independently of one another are a group of the formula

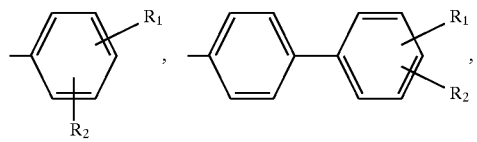

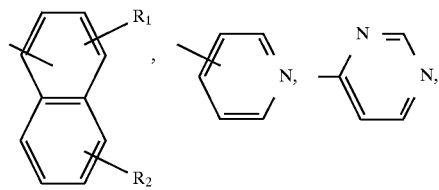

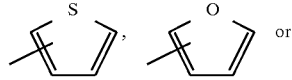

 or

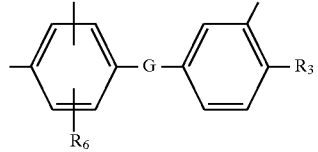

in which

R₁ and R₂ independently of one another are hydrogen, halogen, $C_1$–$C_{18}$alkyl, $C_1$–$C_{18}$alkoxy, $C_1$–$C_{18}$alkylmercapto, $C_1$–$C_{18}$alkylamino, $C_1$–$C_{18}$alkoxycarbonyl, $C_1$–$C_{18}$alkylaminocarbonyl, —CN, —NO₂, trifluoromethyl, $C_5$–$C_6$cycloalkyl, —C=N—($C_1$–$C_{18}$alkyl),

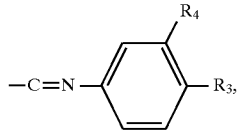

imidazolyl, pyrazolyl, triazolyl, piperazinyl, pyrrolyl, oxazolyl, benzoxazolyl, benzothiazolyl, benzimidazolyl, morpholinyl, piperidinyl or pyrrolidinyl, G is —CH₂—, —CH(CH₃)—, —C(CH₃)₂—, —CH=N—, —N=N—, —O—, —S—, —SO—, —SO₂—, —CONH— or —NR₇—, R₃ and R₄ independently of one another are hydrogen, halogen, $C_1$–$C_6$alkyl, $C_1$–$C_{18}$alkoxy or —CN, R₅ and R₆ independently of one another are hydrogen, halogen or $C_1$–$C_6$alkyl, and R₇ is hydrogen or $C_1$–$C_6$alkyl, with the proviso that R₁ and R₂ are not simultaneously hydrogen if A and B are biphenyl, or b) a quinacridone of the formula

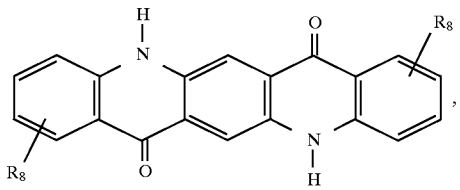

in which R₈ is hydrogen, halogen, $C_1$–$C_6$alkyl or $C_1$–$C_6$alkoxy, in the respective ratio I:II or I:III of 20–90% by weight: 80–10% by weight.

2. A solid solution according to claim 1, which comprises a pyrrolopyrrole of the formula II in which A and B independently of one another are a group of the formula

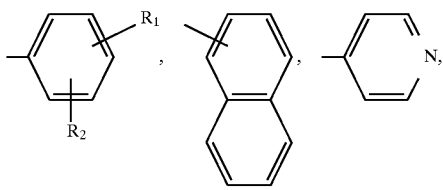

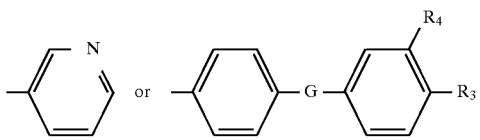

in which R₁ and R₂ independently of one another are hydrogen, chlorine, bromine, $C_1$–$C_4$alkyl, $C_1$–$C_6$alkoxy, $C_1$–$C_6$alkylamino or CN, G is —O—, —NR₇—, —N=N— or —SO₂—, R₃ and R₄ are hydrogen, and R₇ is hydrogen, methyl or ethyl.

3. A solid solution according to claim 2, which comprises a pyrrolopyrrole of the formula II in which A and B are a group of the formula

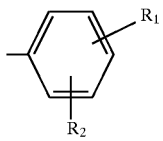

in which R₁ and R₂ independently of one another are hydrogen, methyl, tert-butyl, chlorine, bromine or CN.

4. A solid solution according to claim 1, which comprises a quinacridone of the formula III in which R₈ is hydrogen, methyl or chlorine.

5. A solid solution according to claim 1, consisting of a pyrrolopyrrole of the formula I and a pyrrolopyrrole of the formula II in a ratio I:II of 60–90% by weight: 40–10% by weight.

6. A solid solution according to claim 1, consisting of a pyrrolopyrrole of the formula I and a quinacridone of the formula III in a ratio I:III of 80–90% by weight: 20–10% by weight.

* * * * *